United States Patent [19]

Bénit

[11] 4,345,706
[45] Aug. 24, 1982

[54] LUGGAGE-CARRIER OR AUXILIARY LUGGAGE COMPARTMENT FOR MOTOR CARS

[76] Inventor: Claude Bénit, Transvaalstraat 17, 2600 Berchem, Belgium

[21] Appl. No.: 132,860

[22] Filed: Mar. 24, 1980

[30] Foreign Application Priority Data

Mar. 28, 1979 [BE] Belgium ............................. 2/57691

[51] Int. Cl.³ ............................................... B60R 9/04
[52] U.S. Cl. ................................. 224/327; 224/328; 224/331
[58] Field of Search ................................. 224/327–331

[56] References Cited

U.S. PATENT DOCUMENTS 2,597,656 5/1952 Martin ................................. 224/327
2,654,516 10/1953 Edwards ........................ 224/328 X
3,141,588 7/1964 McMiller ........................... 224/331
3,702,167 11/1972 Olson ................................ 224/331
3,955,731 5/1976 Lindelef et al. .................... 224/328

FOREIGN PATENT DOCUMENTS 1930572 12/1970 Fed. Rep. of Germany ...... 224/331
1242887 8/1960 France ............................. 224/328
717144 10/1966 Italy ................................. 224/328

Primary Examiner—Stephen Marcus
Attorney, Agent, or Firm—Bacon & Thomas

[57] ABSTRACT

Luggage-carrier or auxiliary luggage compartment for motor cars, characterized in that it consists of at least a base serving as loading floor and equipped with supports fitting the car roof and of means allowing the removable fixation of said base to said car roof.

7 Claims, 14 Drawing Figures

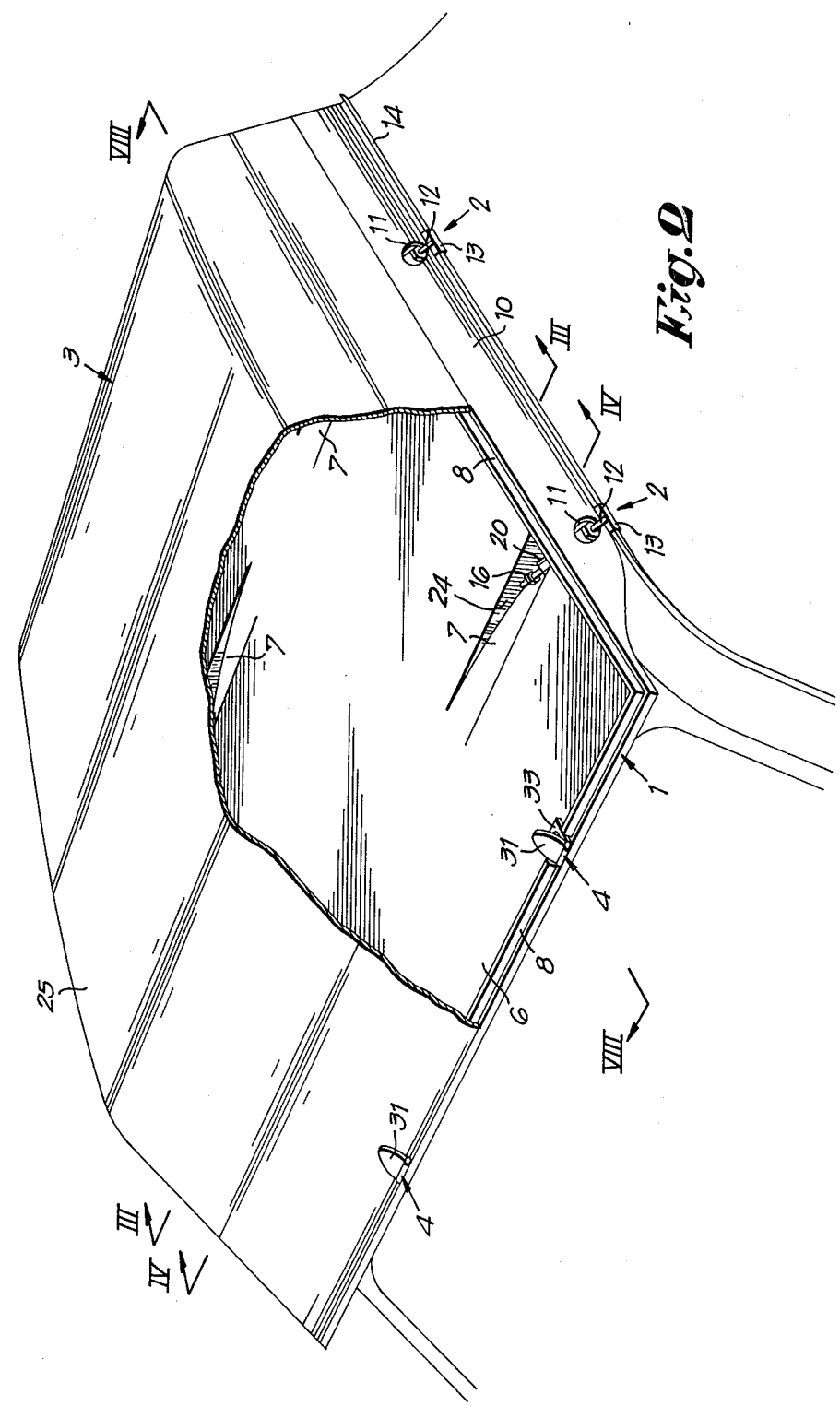

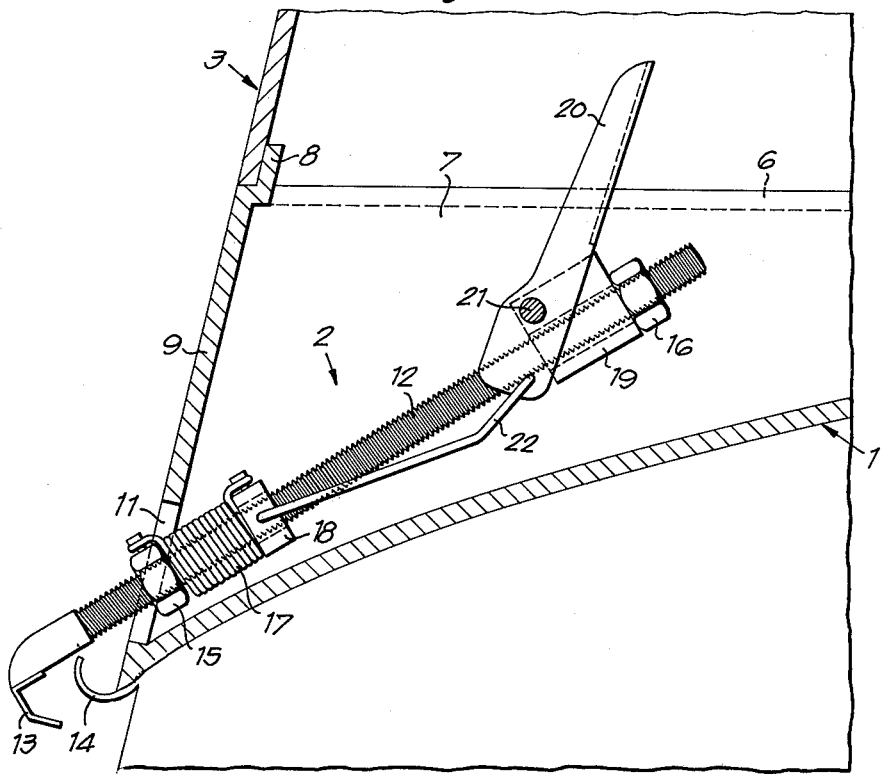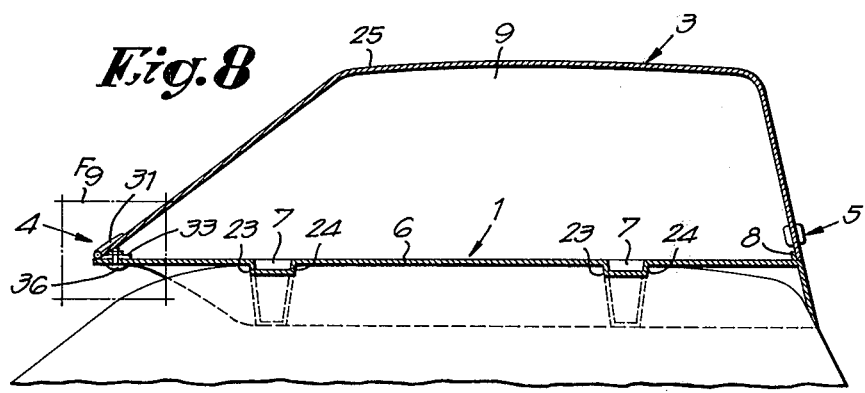

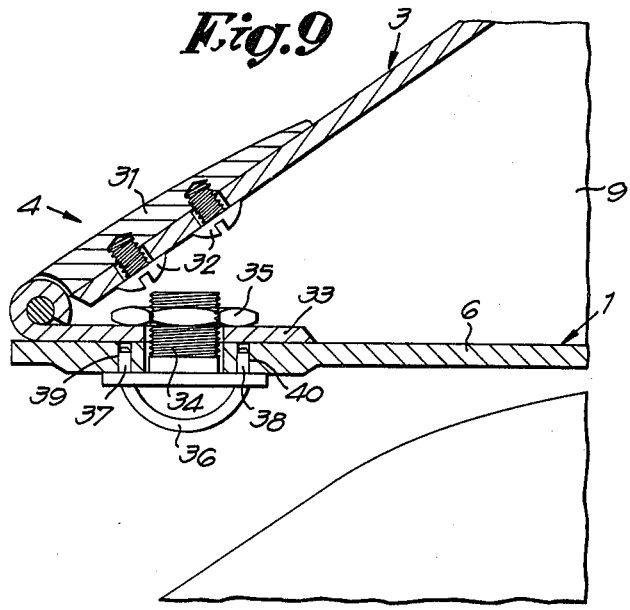
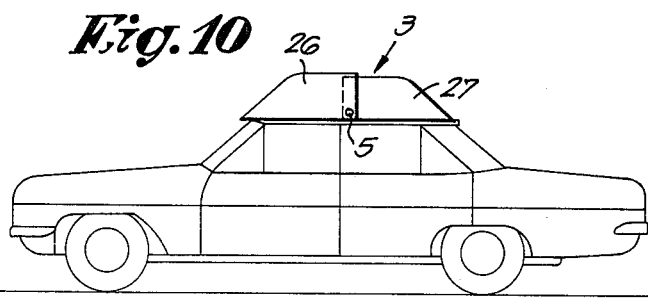
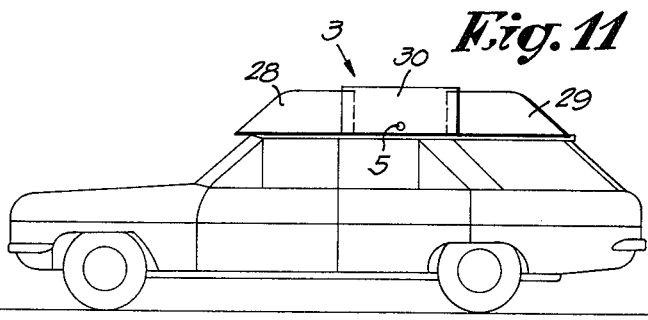

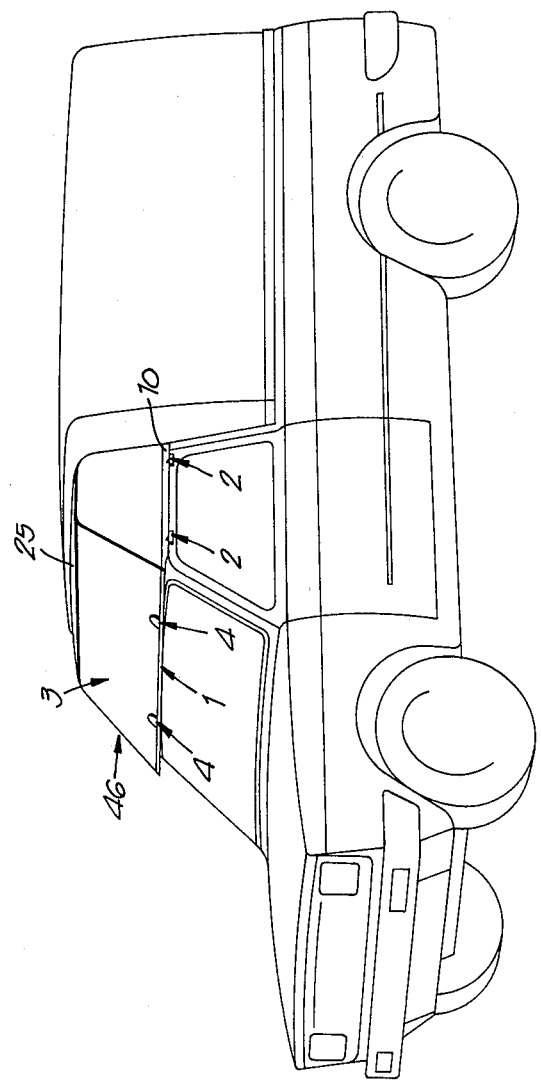

LUGGAGE-CARRIER OR AUXILIARY LUGGAGE COMPARTMENT FOR MOTOR CARS

The present invention relates to a luggage-carrier for motor cars, especially a luggage carrier that can be used as such, even for luggage and articles whose dimensions exceed the outline of the luggage-carrier or as an auxiliary luggage compartment, wherein the transformation of luggage-carriers in luggage compartments and vice-versa is very simple.

For obtaining among other things the above-mentioned advantages, the luggage-carrier according to the present invention consists of a base provided with a fixing device and in combination with said base a lid that can be hingedly fixed to this base, said lid being equipped with a locking device. The base as well as the lid may be upholstered at their inner side.

Other features of the invention will appear from the following description, which refers to the appended drawings wherein:

FIG. 2 is a larger scale perspective view of the luggage-carrier or the luggage compartment according to the present invention, the lid being partly cut away;

FIG. 7 is a view similar to that of FIG. 5, the fixing device being represented in its released state;

FIG. 8 is a section according to line VIII—VIII of FIG. 2;

FIG. 9 is a larger-scale view of the part indicated in F9 in FIG. 8;

FIGS. 10 and 11 are lateral side views of motor cars equipped with a luggage-carrier or a luggage compartment whose lid is made of two or three parts respectively;

FIGS. 13 and 14 are perspective views of utility vehicles equipped with a compartment according to the present invention.

Figure 1:
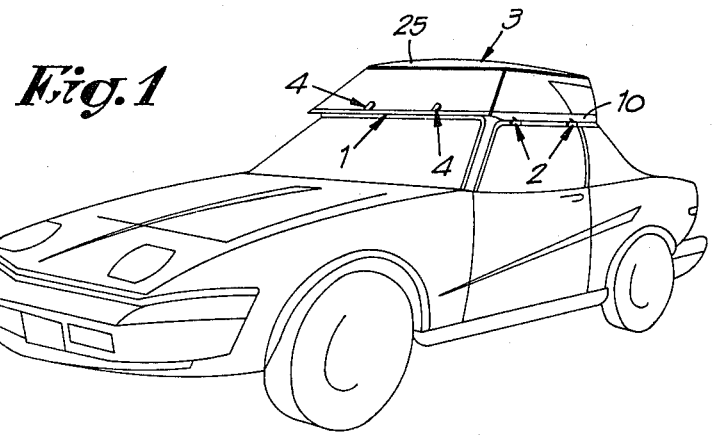
FIG. 1 is a perspective view of a car provided with a luggage-carrier or luggage compartment according to the present invention.
Figure 3:
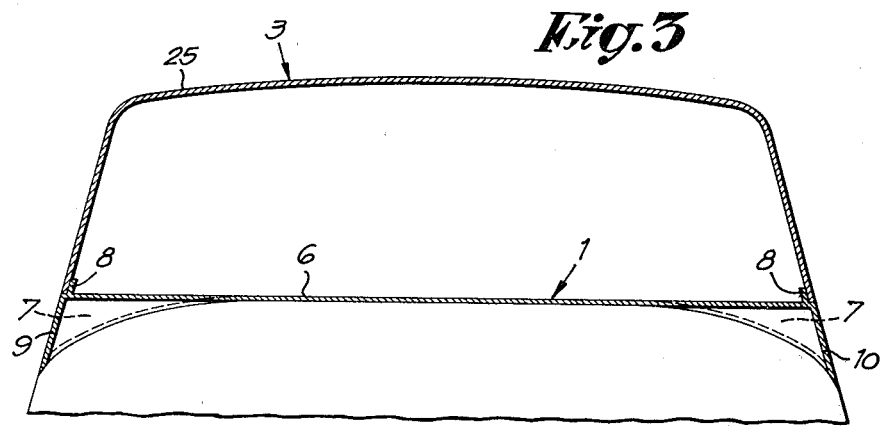
FIGS. 3 and 4 are sections according to the lines III—III and IV—IV in FIG. 2.
Figure 4:
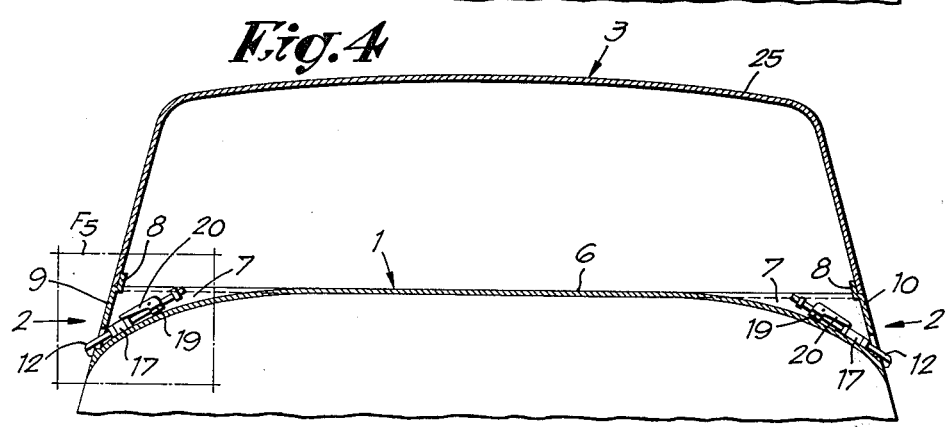
Figure 5:
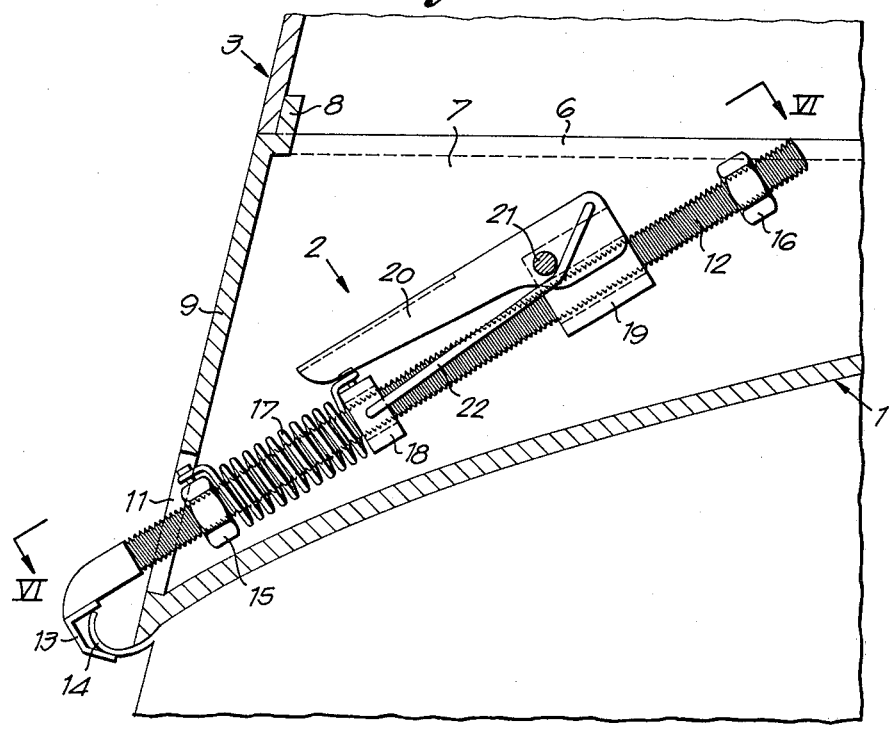
FIG. 5 is a larger-scale view of the part indicated in F5 in FIG. 4.
Figure 6:
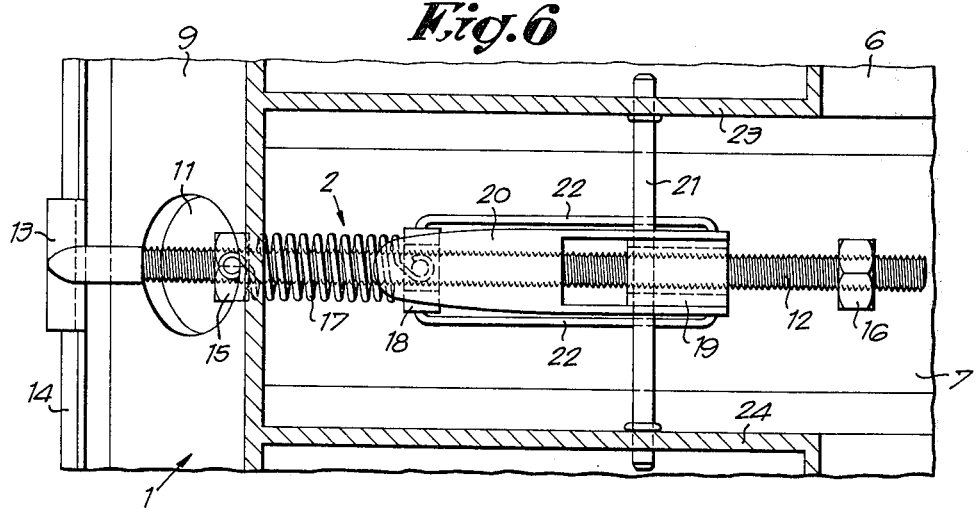
FIG. 6 is a section according to the line VI—VI of FIG. 5.

As represented in the Figures the luggage-carrier or luggage compartment according to the present invention substantially consists of a base 1, a fixing device 2 and optionally a lid 3 fixed to said base by means of hinges 4 and a locking device 5.

The main part of the luggage-carrier or luggage compartment consists of the said base 1 constituting the loading floor and in the case of a luggage compartment also constituting the bottom of that compartment. It has the form of a platform 6 with plane surface whose dimensions are determined by those of the roof of the car.

The base 1 has several open channel members 7 whose lower part fits the roof and so supports the base. Preferably, the outer lower surface of these cross-members is upholstered, which is not represented in the Figure, in order to avoid any damage of the car roof. The number of these cross-members 7 depends on the length of the luggage carrier, on the shape of the latter and on the weight to be supported by the base.

The base 1 has at its periphery a raised edge 8 that can serve as a seating for the lid 3. At each longitudinal rim it also has a reinforcement or support 9 or 10 by means of which base 1 rests on the roof or in the gutter channels of the car.

In the extension of every cross-member 7 the said supports 9–10 are provided with passages 11 for the fixing devices 2. These passages also allow the drainage of rainwater if the base is used as luggage-carrier, i.e. without the use of lid 3.

The channel members 7 also house the fixation devices 2 in such a way that the latter are at a level below the loading floor properly so called.

Evidently base 1 can be moved back or forward with respect to the car roof according to the desire of the user.

Each of the fixing devices 2 consists of a threaded rod 12 provided with a hook 13 to co-operate with the gutter channel 14. Two nuts 15–16 co-operate with the threaded rod 12 and allow on the one hand the control of the strain exerted by the hook 13 on the gutter channel 14 and on the other hand the maximum release (see FIG. 7) of device 2. The latter is completed by a spring 17 fixed between nut 15 and a slider or part 18 that can freely move along rod 12 a second slider or member 19 that can also move freely along said rod; a toggle linkage latch 20 capable of rotating around an axle 21 mounted to said member and a connecting means 22 with "dead centre" between the parts 18 and 19.

The junction of each fixing device 2 with said base 1 is obtained by the axle 21 whose ends fit into the flanks 23–24 of the corresponding cross-member.

It is evident that the base 1 can be fixed or released by operating the latches 20.

Although base 1 in the drawings is equipped with four devices 2, one can also provide at the driver's side devices 2 as described and simple hooks at the opposite side.

According to the type of vehicle lid 3 consists of two or three parts and is limited by its height and dimensions, the volume being usable for the transport of goods.

Preferably this lid 3 matches the aerodynamic outlines of the car and respects its general concept in order to preserve its good lines and its esthetic form as well as to offer the smallest possible resistance to the wind.

When the lid is made of one part 25, it rotates on hinges 4 preferably placed in front, the lock 5 then being placed behind so that the compartment is accessible from either side of the car. As is represented in the drawings the lid engages with the outer rim of the rised edge 8 of the front base, optionally after interposition of a gasket not represented in the drawings.

Evidently the hinges of the lid can be provided on the other rims of the base so that the lid opens either towards one of the sides or towards the rear-side of the car.

In the case of a two-part lid, say the parts 26 and 27 (FIG. 10), they rotate forwards and backwards, the front part resting on the rear part.

In the case of a three-part lid, say the parts 28, 29 and 30 (FIG. 11), the front and the rear parts rotate in the same way as in the example of FIG. 10, whereas the central part 30 rotates towards one of the sides of the vehicle.

The hinges 4 are represented in FIG. 9. They consist of an outer leaf 31 fixed to lid 3 by means of screws 32 and an inner leaf 33 attached to base 1 by means of a bolt 34 in co-operation with a nut 35. The head of bolt 34 is provided at one side with a ring 36 by means of which the lid or the compartment can be suspended if not used, and at the other side of two stops 37 and 38 co-operating with holes 39 and 40 respectively in base 1 to prevent the dismounting of the lid from the outside.

Evidently the inside of the compartment can be upholstered with any covering whatsoever.

Figure 12:
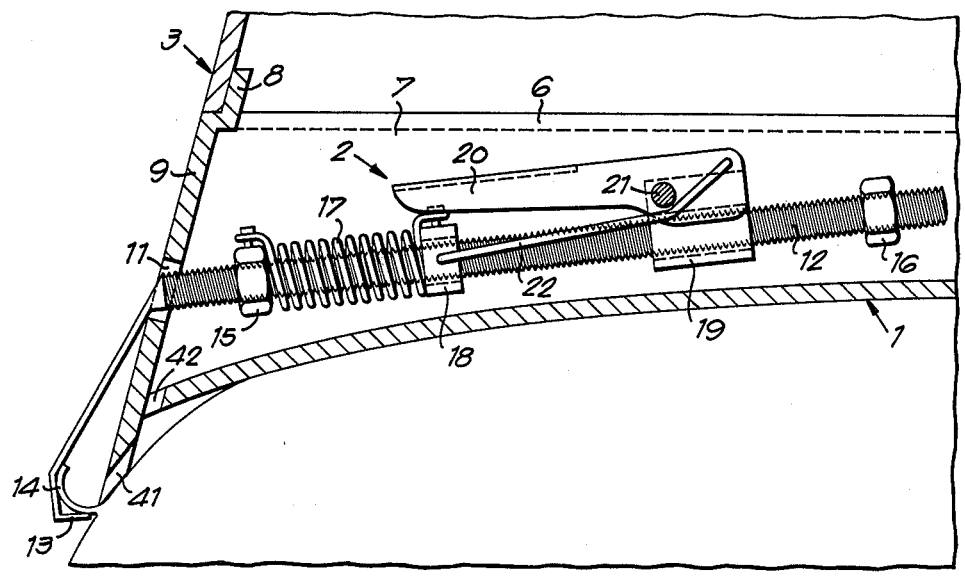
FIG. 12 is a view similar to that of FIG. 5 but for another embodiment.

In the embodiment of FIG. 12 the cross-member 7 does not follow the curvature of the roof up to the gutter channel but forms an integral part with the raised edge 8, which rests alone in the gutter channel. In this case the drainage ports for rainwater are represented by 41 and 42.

Figure 13:
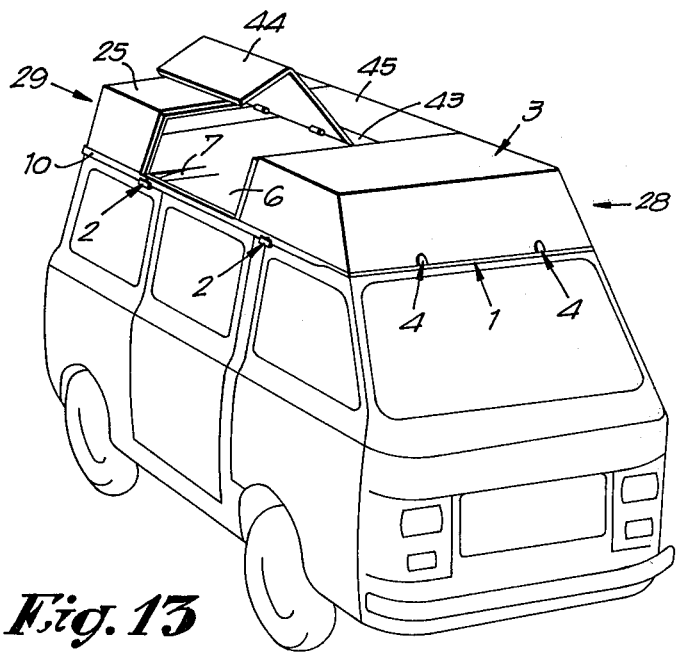

It is self-evident that the luggage-carrier and the luggage compartment according to the present invention can be used for passanger cars as well as for utility vehicles; so, FIG. 13 represents a minibus equipped with a luggage compartment according to the present invention.

In that case the front and the rear parts 28 and 29 of the lid do not rotate although they are held by hinges. They are connected by a rigid beam 43 that can easily be removed and that bears the central parts 44 and 45 of the lid. Evidently the number of central parts has no limit.

Finally FIG. 14 is a drawing of a utility vehicle whose height of the loading frame surpasses the height of the cab bearing a compartment 46 according to the present invention. This compartment 46 is perfectly suited for sheltering, e.g. a LPG bottle. It is evident that such a compartment can be provided on any type of truck or pick-up of 500 kg to 20 t load capacity.

The present invention is not restricted to the examples described above and illustrated in the attached drawings. As a matter of fact different modifications can be made to the described devices by those skilled in the art, without exceeding the scope of the invention.

What I claim is:

1. Luggage carrier for a roof of a motor car having a gutter channel, said carrier including a substantially planar base and a plurality of releasable fixing devices, said base having a plurality of transverse channels with open tops and with bottom parts fitting the shape of said roof, said fixing devices being in said channels, said base further having longitudinal rims each of which is provided with a strip-shaped support, the lower edge of which is shaped to fit in said gutter channel, said support having, in alignment with the said transverse channels, passages for said fixing devices which are adapted to fix said base to said gutter channel.

2. Luggage-carrier according to claim 1 wherein each of said fixing device comprises a threaded rod provided at one end with a hook for engagement with the gutter channel of the car; a nut adjacent each end of said rod; a slider on said rod and a spring between said slider and the nut at the hook end of said rod; said slider being connected to a toggle linkage fixed to said luggage carrier.

3. Luggage-carrier according to claim 1, which further includes a lid comprising at least one part and wherein said base has a peripheral raised edge serving as a seating for said lid which is fixed to said base by means of hinges and which is equipped with a locking device.

4. Luggage-carrier according to claim 3, wherein said lid is comprised of one part and said hinges are located at the front of said car.

5. Luggage-carrier according to claim 3, wherein said lid comprises a front part attached to said base at the front of said car and a rear part attached to the base at the rear of said car.

6. Luggage-carrier according to claim 3, wherein said lid comprises a front part attached to said base at the front side of said car, a central part attached to one of said longitudinal rims of said base, and a rear part attached to said base at the rear side of said car.

7. Luggage-carrier according to claim 3, wherein the inner side of at least one of the base and the lid is upholstered.

* * * * *